Aug. 26, 1924.

J. A. HILLARD

ECCENTRIC

Filed April 30, 1924

1,506,122

J. A. Hillard,
Inventor

By

Attorney

Patented Aug. 26, 1924.

1,506,122

UNITED STATES PATENT OFFICE.

JOSEPH A. HILLARD, OF TACOMA, WASHINGTON.

ECCENTRIC.

Application filed April 30, 1924. Serial No. 710,064.

*To all whom it may concern:*

Be it known that I, JOSEPH A. HILLARD, a citizen of the United States, residing at Tacoma, in the county of Pierce and State of Washington, have invented certain new and useful Improvements in an Eccentric, of which the following is a specification.

This invention relates to new and useful improvements in eccentrics which are principally adapted for use in connection with automobile crank shafts.

One of the important objects of the present invention is to provide an eccentric wherein the usual throw of the crank shaft of an automobile engine is obviated.

A further object is to provide an eccentric which is of such a construction as to enable the same to be manufactured at a very low cost and the parts associated therewith rendering the same strong and durable.

A further object is to provide an eccentric of the above mentioned character, wherein means is associated therewith for providing a raceway for ball bearings, said means being further adapted to provide a connection between the connecting rod and the crank shaft on which the eccentric is mounted.

Other objects and advantages of this invention will become apparent during the course of the following description.

In the accompanying drawing forming a part of this specification and in which like numerals designate like parts throughout the same:

Figure 1:
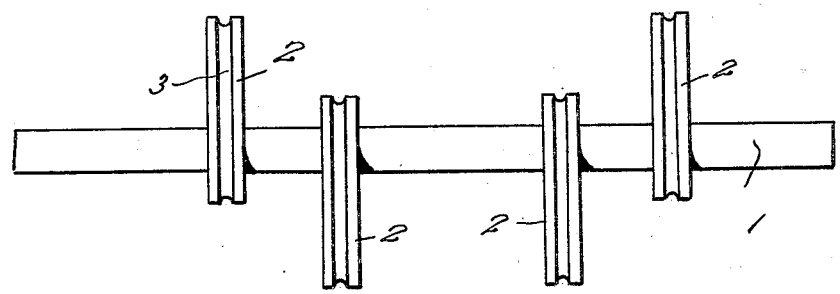
Figure 1 is a side elevation of an engine shaft with the eccentrics arranged thereon.

In the drawing wherein for the purpose of illustration is shown the preferred embodiment of my invention, the numeral 1 designates the engine shaft and carried by the same are the eccentrics, the eccentrics being arranged thereon for cooperation with the connecting rods of each piston in the manner well known in the art. The eccentrics which are designated by the numeral 2 may either be cast integrally with the shaft 1 or keyed thereon in any well known manner.

Each eccentric comprises a disc which is provided with an annular groove such as is shown at 3 in the periphery thereof, the same providing a raceway for the reception of the ball bearings shown at 4. The raceway 3 provided in the periphery of the eccentric 2 cooperates with the grooves 5 and 6 formed in the inner periphery of the segmental sections 7 and 8 respectively in supporting the ball bearings 4 in proper position between the segmental sections and the eccentrics.

Figure 2:
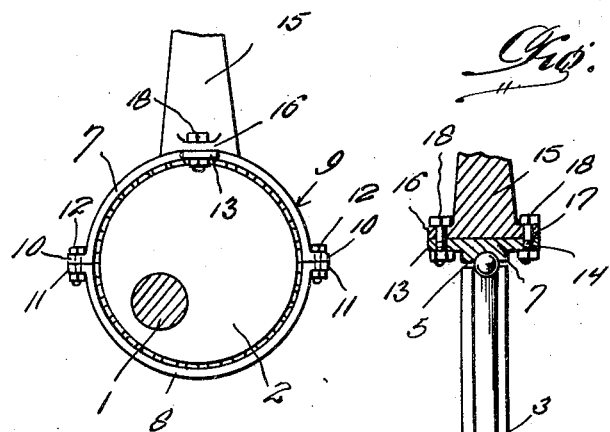
Figure 2 is a side elevation of the eccentric showing the same in assembled position with respect to the connecting rod and the ball bearings associated therewith.
Figure 3:
Figure 3 is a fragmentary sectional view of the lower portion of the connecting rod and the clamping ring, showing the eccentric in edge elevation and the ball bearing raceway with the ball bearings therein.

The segmental sections 7 and 8 coact to provide a clamping ring or band 9 and the adjacent end of the sections are provided with outwardly disposed lugs or projections 10 and 11 respectively for receiving the securing means 12, whereby the clamping ring 9 will be securely supported in position around the eccentric 2 in the manner more clearly illustrated in Figure 2 of the drawing. The clamping ring 9 furthermore has its segmental section 7 provided with the laterally extending ears 13 and 14 which are arranged on opposite sides of the intermediate portion of the section 7 and this construction affords a means whereby a connecting rod 15 which is also provided with the lateral extensions 16 and 17 respectively may be secured to the clamping rings by means of the fastening bolts 18 which extend through the registering openings provided in the lateral extension formed on each side of the segmental section 7 and the lower end of the connecting rod 15 in the manner clearly illustrated in Figure 3 of the drawing.

The provision of a construction of the character above described will eliminate the usual throw of the engine drive shaft and the engine will be adapted to operate efficiently and in a noiseless manner. If desired, the eccentric 2 may be provided with radially extending channels or recesses whereby a lubricant may be supplied to the ball bearings in the manner well known in the art. An eccentric of the character above described will enable the clamping ring 9 to be readily disassembled whenever necessary and when the same is in position around the eccentric there will be no possibility of the clamping ring becoming disengaged therefrom. Further, a device of this character may be manufactured at a very low cost and the parts will be strong and durable.

While I have shown the preferred embodiment of my invention, it is to be understood that various changes in the size, shape and arrangement of parts may be resorted to without departing from the spirit of the invention and the scope of the appended claims.

Having thus described my invention, what I claim is:—

In combination with a shaft, a connecting rod, means for connecting the rod to said shaft comprising an eccentric mounted on said shaft, said eccentric having an annular groove formed in the periphery thereof, a clamping ring extending around said eccentric and comprising a pair of coacting sections secured together at their adjacent ends, said clamping ring having an annular groove provided in the periphery thereof coacting with the annular groove provided in the periphery of the eccentric to provide a raceway, ball bearings positioned in said raceway, said clamping ring having lateral extensions formed on the upper portion thereof, coacting lateral extensions formed on the lower end of the connecting rod, and fastening means associated with the aforementioned coacting lateral extensions for securing a connecting rod to the clamping ring.

In testimony whereof I affix my signature.

JOSEPH A. HILLARD.